United States Patent [19]

Ocvirk et al.

[11] Patent Number: 4,793,663
[45] Date of Patent: Dec. 27, 1988

[54] VALVE ARRANGEMENT FOR BRAKE SYSTEMS OF AUTOMOTIVE VEHICLES COMPRISING AN ELECTRONIC ANTILOCKING AND TRACTION SLIP CONTROL

[75] Inventors: Norbert Ocvirk, Offenbach; Lutz Weise, Mainz; Horst-Peter Becker, Frankfurt Am Main; Otto Determann, Darmstadt, all of Fed. Rep. of Germany

[73] Assignee: Alfred Teves GmbH, Frankfurt Am Main, Fed. Rep. of Germany

[21] Appl. No.: 73,487

[22] Filed: Jul. 15, 1987

[30] Foreign Application Priority Data
Jul. 22, 1986 [DE] Fed. Rep. of Germany ....... 3624722

[51] Int. Cl.$^4$ .............................................. B60T 8/48
[52] U.S. Cl. ..................................... 303/110; 303/119
[58] Field of Search ................ 180/197; 303/110, 111, 303/113, 114, 116, 119

[56] References Cited

U.S. PATENT DOCUMENTS 4,641,895 10/1987 Belart et al. .................... 303/110 X Primary Examiner—Duane A. Reger
Attorney, Agent, or Firm—James B. Raden

[57] ABSTRACT

Through a valve arrangement for brake systems of automotive vehicles comprising an electronic antilocking and traction slip control including a two-circuit brake pressure generator (3) and an auxiliary pressure supply system (5) generating an auxiliary pressure proportional to the pedal force and, in traction slip control, generating an uncontrollable auxiliary pressure, either the brake pressure generator (1) or the auxiliary pressure supply system is capable of being connected to the wheel brakes (26–29). The non-driven wheel (HR, HL) of the vehicle is connected directly while the drive wheel (VR, VL) of the vehicle is connected, through an additional multi-way valve, to the brake pressure generator (1) and to the auxiliary pressure supply system (12). Moreover, the wheel brakes (27, 29) of the driven wheels (VR, VL), through additional multi-way valves (20, 21) for the traction slip control, can be directly connected to the auxiliary pressure supply system(5).

9 Claims, 1 Drawing Sheet

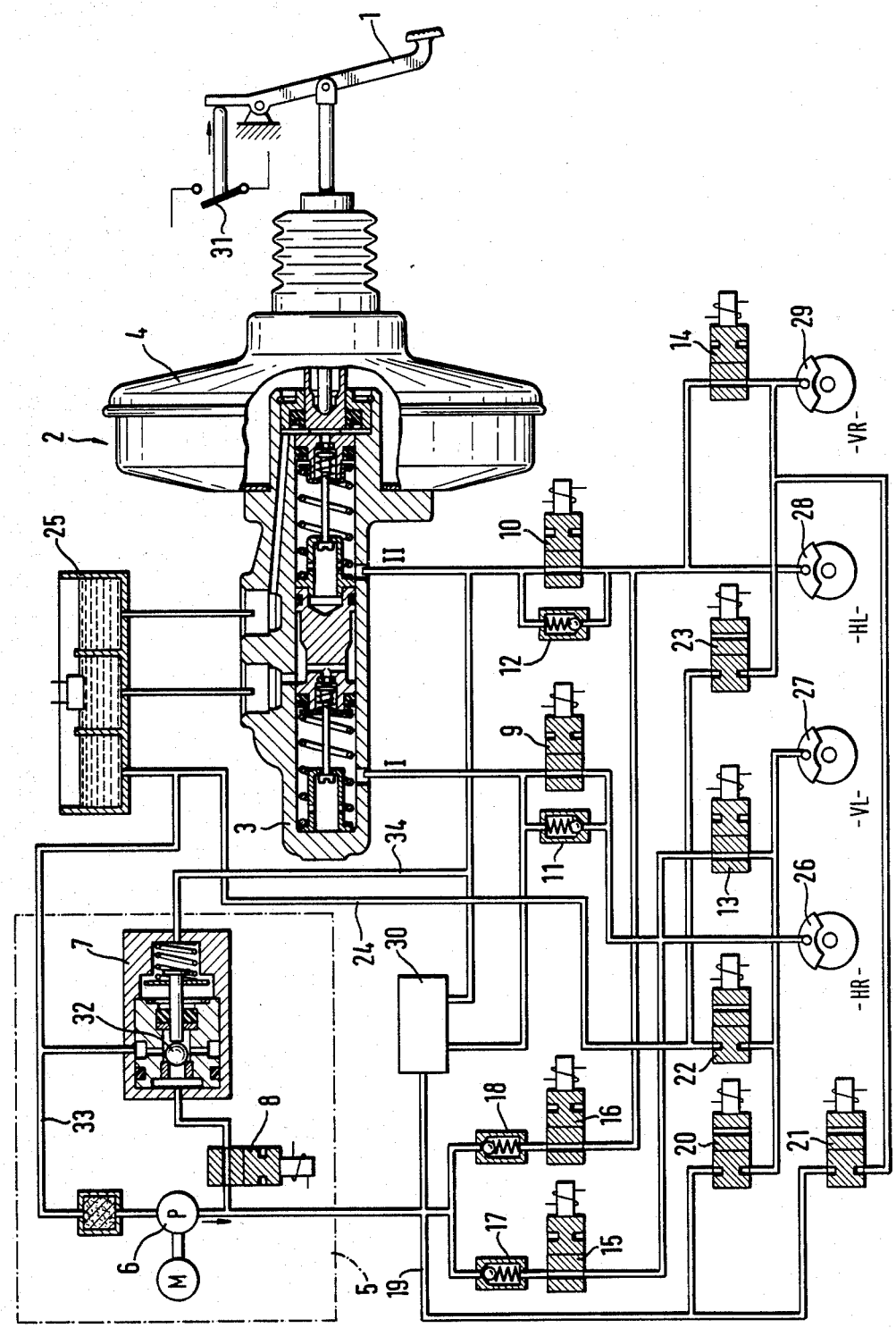

VALVE ARRANGEMENT FOR BRAKE SYSTEMS OF AUTOMOTIVE VEHICLES COMPRISING AN ELECTRONIC ANTILOCKING AND TRACTION SLIP CONTROL

BACKGROUND OF THE INVENTION

The present invention is concerned with a valve arrangement for brake systems having electronic antilocking and traction slip control systems and which are to be used with automotive vehicles. Such brake systems include an auxiliary force-supported two-circuit brake pressure generator to the brake circuits of which are respectively connected one front wheel and one rear wheel, preferably in diagonal brake circuit division, and also include an auxiliary pressure supply system which, in antilocking control, generates a controlled auxiliary pressure proportional to the pedal force and, in traction slip control, generates a predetermined auxiliary pressure. By way of a valve arrangement, in controlled braking operations, the auxiliary pressure supply system in lieu of the brake pressure generator, through check valves, is connected to the wheel brakes. In each brake circuit, in the pressure fluid conduit leading from the brake pressure generator to the wheel brakes and, in the pressure fluid conduit leading from the auxiliary pressure supply system to the wheel brakes, respectively, one multi-way valve, open for fluid passage in the resting position, is provided. By way of the valve arrangement, in the control phases, the brake pressure is controllable in response to the rotational pattern of the vehicle wheels and/or to the speed of the motor vehicle.

A valve arrangement of this type has been suggested wherein respectively one front wheel and one rear wheel, through multi-way valves open in the resting position, are connected to the two-circuit brake pressure generator, e.g. to a tandem master cylinder coupled ahead of which is a vacuum brake force booster (patent application No. P 36 23 149.5). Connected behind the said valve, i.e. between the outlet of the said valve and the wheel brakes, through a multi-way valve and a series-connected check valve, is the auxiliary pressure supply system such that, after blocking the fluid pressure conduit from the brake pressure generator and after reswitch of the valves, by way of which the wheel brakes are connected to the brake pressure generator, only auxiliary pressure can be fed to the wheel brakes. Moreover, in the prior known valve arrangement, in the pressure fluid conduit leading to the non-driven wheel, another 2-way/2-position valve open in the resting position, is provided which, in the traction slip control phase, is switched to the blocking position so that, in the traction slip control phase, auxiliary pressure is fed only to the driven wheel. Moreover, during antilocking control, the brake pressure, in the wheel brake of the non-driven wheel, can be kept constant, with the pressure in the wheel brake of the second wheel in communication with the same hydraulic circuit being variable.

A "separating valve" provided in the pressure fluid conduit leading to the non-driven wheel, also is already known from W. German published application DE-OS 34 07 538 describing a brake system comprising a master cylinder and a hydraulic brake force booster. In the antilocking control phase, pressure fluid at controlled pressure is discharged from the brake force booster and dynamically fed to the master cylinder. For traction slip control, the pressure fluid conduit leading to the driven wheel is reswitched for direct connection to the hydraulic accumulator of the auxiliary pressure source.

A disadvantage with these state-of-the-art systems and valve arrangements, respectively, resides in that, owing to the restriction to two hydraulically separated circuits and the provision of the valve required for traction slip control in the pressure fluid connecting conduit leading to the non-driven wheel in the pressure build-up phase, it is only possible to feed an elevated brake pressure into the wheel brake of the driven wheel. However, during deceleration of an automotive vehicle, after releasing the gas pedal, the driven wheels are already decelerated by the motor drag moments. It would be advantageous for the brake slip control if in that brake phase, a higher brake pressure were applied to the non-driven wheels than to the driven wheels.

SUMMARY OF THE INVENTION

It is, therefore, an object of the invention to provide a valve arrangement including as few and simple valves as possible which permits both antilocking and traction slip control and which, in the control of the brake pressure pattern, the motor drag moments can be taken into account and which, in the pressure build-up phase, a brake pressure higher than the pressure applied to the driven wheels can be fed to the wheel brakes of the non-driven wheels.

It has been found that the noted problem can be solved by a valve arrangement of the afore-described type by spending comparatively little effort in that, in each brake circuit, the non-driven wheel of the automotive vehicle is connected directly, while the driven wheel of the automotive vehicles is connected through another multi-way valve, open in the resting position, to the multi-way valves for connection of the brake pressure generator and/or the auxiliary pressure supply system. Moreover, the driven wheels through a multi-way valve, blocked in the resting position, are connected to a pressure compensating tank and, through at least one further valve, via which auxiliary pressure can be fed to the traction slip control phase, are connected to the auxiliary pressure supply system.

The extra effort involved with the valve arrangement of the invention compared with the prior art suggestions, hence, is restricted to one extra multi-way valve per brake circuit. Each of these extra valves is blocked in the resting position.

According to another embodiment of the invention, in lieu of the said normally blocked valves, one valve, open in the resting position, may be provided which is in communication with the hydraulically series-connected check valve. The pressure pattern despite these low extra efforts, both in the antilocking and in the traction slip control phase, can be adapted to substantially all requirements practically occurring. Any unnecessary pressure fluctuations caused by an initially excessive pressure build-up on the driven wheel and by a subsequent pressure drop after reswitching the valve separating the front wheel from the rear wheel, are precluded. A control improved by the valve arrangement of the invention exhibits a shorter stopping distance and a higher driving stability because the brake pressure on the non-driven wheel can be increased without jeopardizing the stability of the wheel already decelerated by the drag moment.

According to an advantageous embodiment of the invention, one check valve opening toward the brake pressure generator is connected in parallel to the multi-way valves by way of which the brake pressure generator is connected to the wheel brakes. This will insure a rapid brake pressure decrease independent of the switching position of the parallel valve after release of the brake.

According to another embodiment of the invention, the brake pressure generator and the auxiliary pressure supply system are connected in parallel to the wheel brakes. However, it will also be possible for the multi-way valves for connection of the brake pressure generator and the auxiliary pressure supply system to the wheel brakes to be placed in series arrangement into the pressure fluid conduit leading from the brake pressure generator to the wheel brakes. The auxiliary pressure supply system, through check valves, is connected between these two multi-way valves of each brake circuit.

The valve arrangement of the invention is particularly simple if all multi-way valves are in the form of electromagnetically operable 2-way/2-position valves.

BRIEF DESCRIPTION OF THE DRAWING

Further features, advantages and end-use applications of the invention can be seen from the following description of a preferred embodiment of the invention taken with reference to accompanying drawing, the single FIGURE of which is a simplified and partly schematical illustration of the major hydraulic components.

DETAILED DESCRIPTION OF A PREFERRED EMBODIMENT

The drawing illustrates a brake system for automotive vehicles having front wheel drive. It includes a brake pressure generator 2 operable by brake pedal 1 and composed of a tandem master cylinder 3 coupled to which is a vacuum brake force booster 4.

The system is furnished with an auxiliary pressure supply system 5 substantially comprising a hydraulic pump 6 driven by electromotive force, an auxiliary pressure control valve 7 and a 2-way/2-position valve 8 acting as a blocking valve in the traction slip control phase and being electromagnetically operable.

Connected to tandem master cylinder 3, through two hydraulically separated brake circuits I, II, in diagonal arrangement, is respectively one front wheel and one rear wheel. That is, front wheel VL and rear wheel HR are connected to brake circuit I while front wheel VR, and rear wheel HL are connected to brake circuit II.

Provided in the pressure fluid conduit leading from the brake pressure generator 2 to the diagonal wheels VL, HR and VR, HL, respectively, is one 2-way/2-position valve 9, 10 each open-i.e. switched to permit fluid passage-in the resting position. A check valve 11, 12 is connected in parallel with each valve 9, 10 respectively, to open toward the brake pressure generator.

Directly connected to the outlet of the said valves 9, 11; 10, 12 is respectively a rear wheel HR; HL. The pressure fluid conduits to the second wheel of the diagonal, viz. to the driven front wheels VL, VR, are respectively through another multi-way valve 13, 14 also in the form of a 2-way/2-position valve open in the resting position.

The auxiliary pressure supply system 5 is connected through normally open, i.e., open in the resting position, multi-way valves 15, 16 to the conduits behind valves 9 and 10, respectively. Thus, valve 15 communicates with wheel brake 26 and valve 13; valve 16 communicates with wheel brake 28 and valve 29. Connected in series to valves 15, 16 is, respectively, one check valve 17, 18 which preclude hydraulic coupling of the two brake circuits I, II. As long as the auxiliary pressure supply system 5 is inoperative, the check valves 17, 18 prevent pressure fluid from flowing off the brake pressure generator and brake circuits I, II, respectively, in case of a normal and uncontrolled deceleration.

To feed auxiliary pressure from the supply system 5 to the wheel brakes 27, 29, of the driven wheels, viz. of the front wheels VL, VR, an additional auxiliary pressure connection line 19 is provided. One multi-way valve 20, 21 formed as a 2-way/2-position valve blocked in the resting position, is provided in the line 19 which leads to the respective wheels and wheel brakes, respectively.

Through one additional 2-way/2-position valve 22, 23, a connection to the pressure compensating tank 25 can be established through a pressure fluid return line 24. Each valve 22, 23 is blocked in the resting position, for the purpose of a pressure decrease, in particular, in the antilocking control phase, but also in traction slip control. The return line 24 is connected, in conventional manner, to the master cylinder 3 and to the intake side of the hydraulic pump 6 of the auxiliary supply system.

Finally, a differential pressure switch 30 is provided to compare the pressures in the brake circuits I, II with one another and with the auxiliary pressure; also, it serves in a known manner, to watch the proper operation of the system, to indicate errors etc.

The operation of the brake system will now be described.

In normal, i.e. non-controlled braking operations, all multi-way valves, viz. valves 8 through 10, 13 through 16, and 20 through 23, are in the switching position shown in the drawing. The brake pressure building up in the master cylinder 3, upon operation of the brake pedal 1, hence, directly propagates to the wheel brakes 26 through 29. Motor M of the hydraulic pump 6 of the auxiliary pressure supply system 5 will be operative only upon generation of a slip control signal or through a switch 31 dependent on the pedal position or through a way-dependent switch (not shown) when a predetermined advance of the working piston in the interior of the master cylinder 3 is exceeded.

After switch-on of the hydraulic pump 6-through an antilocking or traction slip control signal or upon an excessive advance of the working piston in the master cylinder 3-through the pressure control valve 7-pressure fluid flows from the pressure side of the pump 6 through the multi-way valve 8, switched to passage, through a ball seat valve 32 in the auxiliary pressure control valve 7 and through a pressure fluid return line 33, to the intake side of the said pump 6. This flow is restricted in response to the momentary brake pressure in brake circuit II acting on valve 7 through a pressure fluid line 34. Hence, an auxiliary pressure develops on the suction side of the hydraulic pump 6 and the value of this pressure is in proportion to the brake pressure in brake circuit II and, hence, to the force exerted upon the brake pedal 1.

As soon as a vehicle wheel tends to lock, the antilocking control will commence. Valves 9, 10 are electrically reswitched to the blocking position thereby hydraulically connecting the auxiliary pressure supply system through the valves 15, 17 and 16, 18 in lieu of a brake pressure generator 2 to wheel brakes 26 through 29. With the aid of the outlet valves 22, 23 and the inlet valves 15, 16 in the auxiliary pressure supply system, and, if need be, the multi-way valves 13, 14 interrupting the pressure fluid path to the driven wheels (in the present instance, front wheels VL; VR), the brake pressure in wheels 26 through 29 may be lowered, maintained constant or reraised. By a temporary or pulsated reswitch of valves 13 or 14, it is possible-in order to account for the drag moments acting upon the driven wheels 27, 29-for the pressure on the non-driven wheels 26, 28 to be raised more rapidly or adjusted to a higher value which, hitherto, has been permitted only with brake systems comprising three or four control channels.

After releasing the brake, the brake pressure is immediately lowered on the rear wheels HR, HL, whereas, on the front wheels VL, VR, after restoring of the valves 13, 14, it is decreased through the check valves 11, 12 and/or through the restored multi-way valves 9, 10 and through the master cylinder 3.

If the traction slip on the driven wheels VL, VR, during take off or acceleration, becomes excessively high, the hydraulic pump 6 and the driving motor M, respectively, become operative and the multi-way valve 8 is reswitched to blocking. Also, in the absence of a pressure in brake circuit II and, hence, of a control pressure on the auxiliary pressure control valve 7, after start-up of the pump 6, auxiliary pressure, the amount of which is restricted by the pump delivery, if desired, or by an excess-pressure valve (not shown) will thus be available on the outlet of the auxiliary pressure supply system 5.

The multi-way valves 13, 14 through which the wheels of a motor vehicle diagonal, viz. HR, VL; HL, VR respectively are hydraulically in communication, will be electrically reswitched to their blocking position. Through energizing and reswitching the valves 20, 21 in the connecting conduit 19 leading to the auxiliary pressure supply system 5, brake pressure can be fed to the wheel brakes 27, 29 without applying at the same time brake pressure to the multi-way valves 15, 16 reswitched to preclude pressure fluid from flowing into the master cylinder 3. With the aid of valves 20, 21 and the outlet valves 22, 23, also in the traction slip control phase, the pressure supplied from the auxiliary pressure supply system 5 may be proportioned or controlled as desired.

The wheel sensors included in the brake system of the type as shown, by way of which the rotating pattern of the wheels is detected and analyzed for generating brake pressure control signals, and the electronic circuits for processing the electromagnetically operable multi-way valves, have not been illustrated because the said signal generation and processing have no bearing on the valve arrangement of the invention.

What is claimed is:

1. A valve arrangement for automotive brake systems having electronic antilocking and traction slip control, said arrangement comprising a brake pressure generator (2) that includes a brake pedal (1), a tandem master cylinder (3), and a vacuum brake force booster (4), said brake pressure generator (2) being connected to two hydraulic brake circuits (I, II) each of which is connectible to one front wheel and one rear wheel, an auxiliary brake pressure generator associated with each of the brake circuits, said auxiliary brake pressure generator including an auxiliary pressure supply system (5) comprising a hydraulic pump (6), an auxiliary pressure control valve (7), and a 2-way/2-position valve (8), said valve arrangement further comprising a first multi-way valve (9, 10) in each brake circuit, said first multi-way valve (9, 10) being open in the resting position, and being provided in the pressure fluid conduit from said brake pressure generator and in the pressure fluid path from said auxiliary pressure supply system to the wheel brakes, the driven wheel of the vehicle being connected through a second multi-way valve (15, 16) open in the resting position, to said first multi-way valves (9, 10) for connection to the brake pressure generator (2) and the auxiliary pressure supply system (5), a third multi-way valve (22, 23) associated with each driven wheel of the vehicle blocked in the resting position and in communication with a pressure compensating tank, and at least one additional valve between said auxiliary pressure supply system and the driven wheels of the vehicle, said additional valve being operative to feed auxiliary pressure in the traction slip control phase to the driven wheels of the vehicle.

2. A valve arrangement according to claim 1, wherein said additional valve is a multi-way valve (20, 21), blocked in the resting position, for feeding the auxiliary pressure in the traction slip control phase.

3. A valve arrangement according to claim 1, wherein said first multi-way valves (9, 10) include a multi-way valve (13, 14), open in the resting position, and a check valve connected thereto in series for feeding auxiliary pressure in the traction control phase.

4. A valve arrangement according to claim 1 wherein a check valve opening toward the brake pressure generator is connected parallel to some of said multi-way valves so that the brake pressure generator is connected to the wheel brakes.

5. A valve arrangement according to claim 1 wherein the brake pressure generator and the auxiliary pressure supply system are connected in parallel to the wheel brakes.

6. A valve arrangement according to claim 1 wherein the multi-way valves for connection of the brake pressure generator and the auxiliary supply system to the wheel brake are connected in series with the auxiliary pressure supply system through check valves connected between some of said first multi-way valves of each brake circuit.

7. A valve arrangement according to claim 1 wherein all multi-way valves are in the form of electromagnetically operable 2-way/2-position valves.

8. A valve arrangement according to claim 1 wherein said auxiliary pressure supply system, in antilocking control, generates a controlled auxiliary pressure in proportion to the pedal force, and, in traction slip control, generates a predetermined auxiliary pressure, by way of which, in controlled braking operations, the auxiliary pressure supply system in lieu of the braking pressure generator can be connected to the wheel brakes.

9. A valve arrangement according to claim 1 wherein said first multi-way valves (9, 10) being operative in the control phases to control the brake pressure in response to the rotating pattern of the wheels of the vehicle and to the speed of the vehicle, in each brake circuit the non-driven wheel of the vehicle being connected directly to said first multi-way valves (9, 10) for connection to said brake pressure generator and to said auxiliary supply system.

* * * * *